(No Model.) 5 Sheets—Sheet 2.
T. V. ALLIS & J. H. TEMPLIN.
MACHINE FOR SPLICING AND REREELING FENCING STRIPS.
No. 543,823. Patented July 30, 1895.
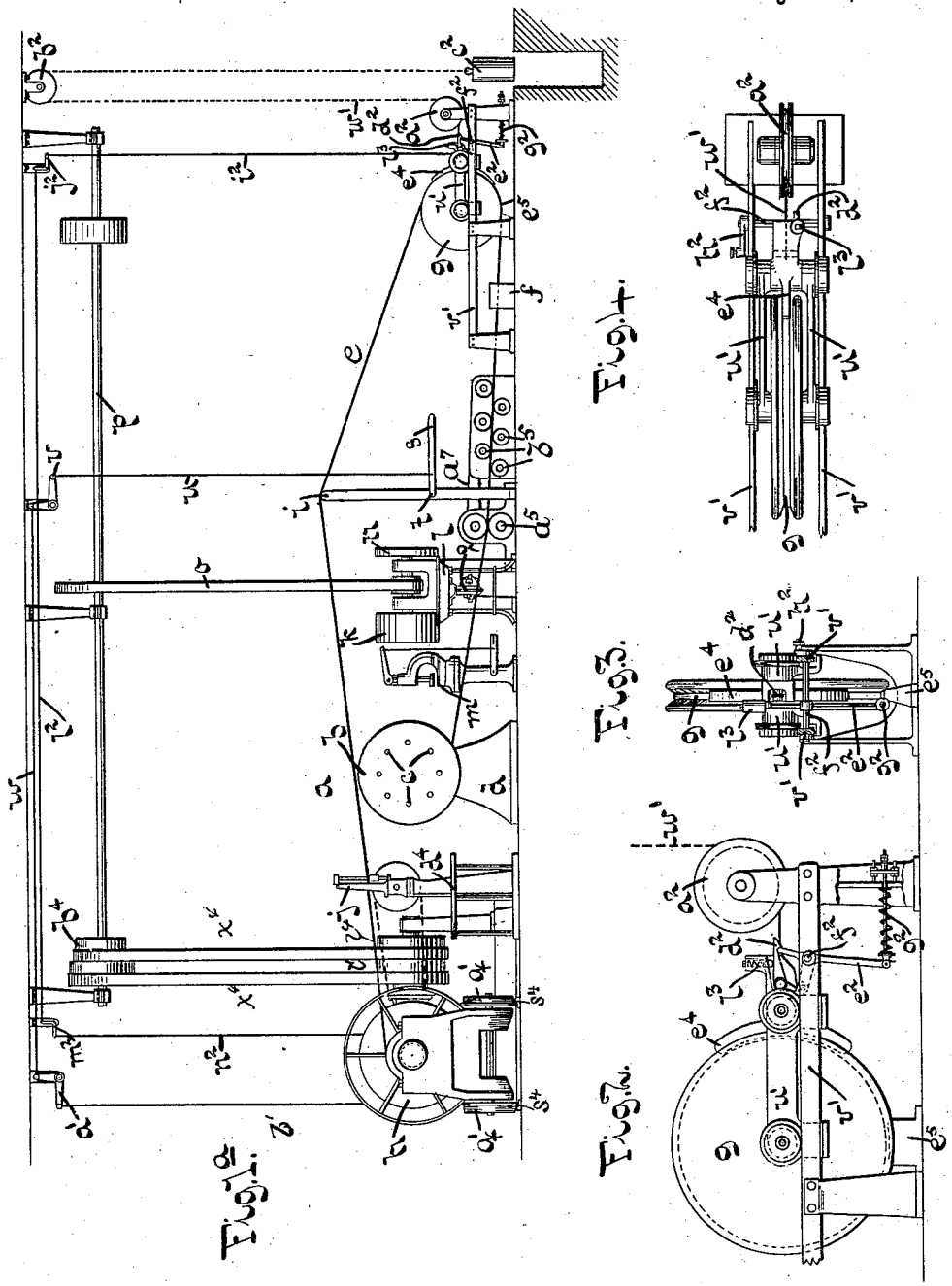
Witnesses:
D. J. Morgan
S. H. Morgan
Inventors:
Thos. V. Allis
Jos. H. Templin
by A. P. Thayer
Attorney.

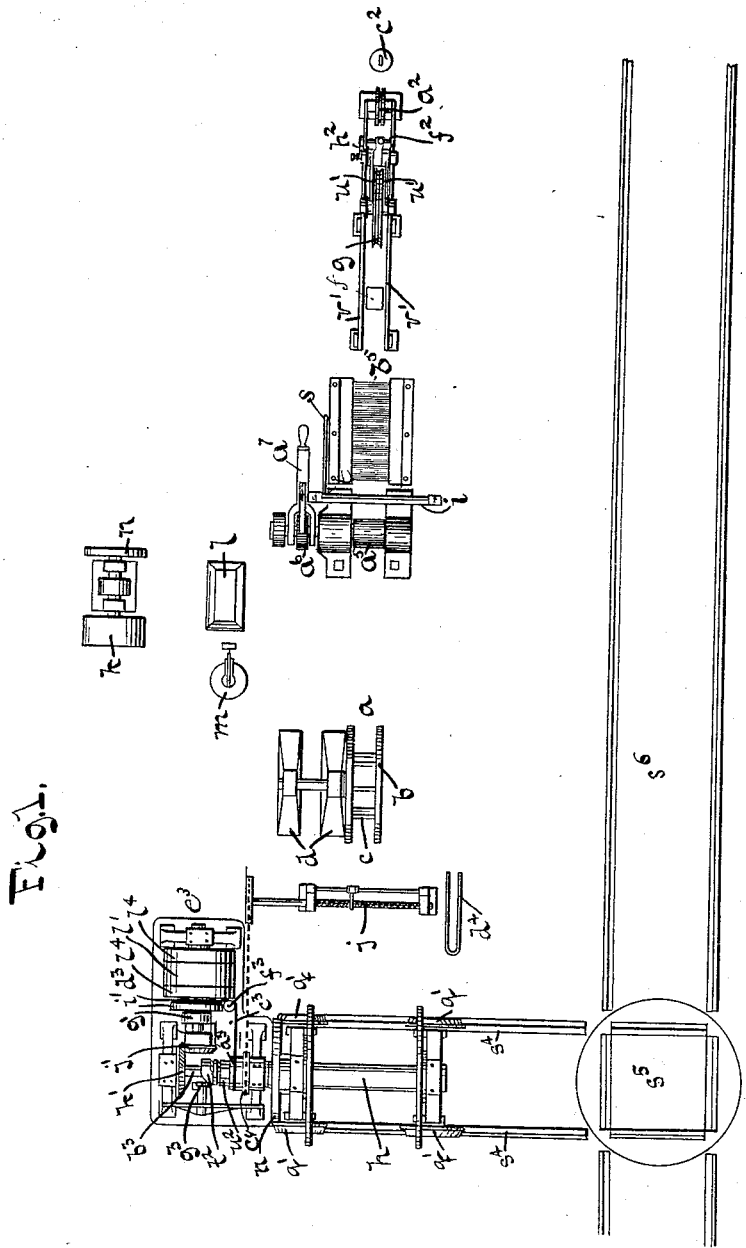

(No Model.) 5 Sheets—Sheet 3.

T. V. ALLIS & J. H. TEMPLIN.
MACHINE FOR SPLICING AND REREELING FENCING STRIPS.

No. 543,823. Patented July 30, 1895.

WITNESSES:
W. Morgan
S. H. Morgan

INVENTORS:
Thos. V. Allis
Jos. H. Templin
BY A. P. Thayer
ATTORNEY (No Model.) 5 Sheets—Sheet 4.
T. V. ALLIS & J. H. TEMPLIN.
MACHINE FOR SPLICING AND REREELING FENCING STRIPS.
No. 543,823. Patented July 30, 1895.

Witnesses:
Inventors:
Thos V Allis
Jos. H. Templin
by A. P. Thayer
Attorney.

(No Model.) 5 Sheets—Sheet 5.
T. V. ALLIS & J. H. TEMPLIN.
MACHINE FOR SPLICING AND REREELING FENCING STRIPS.
No. 543,823. Patented July 30, 1895.
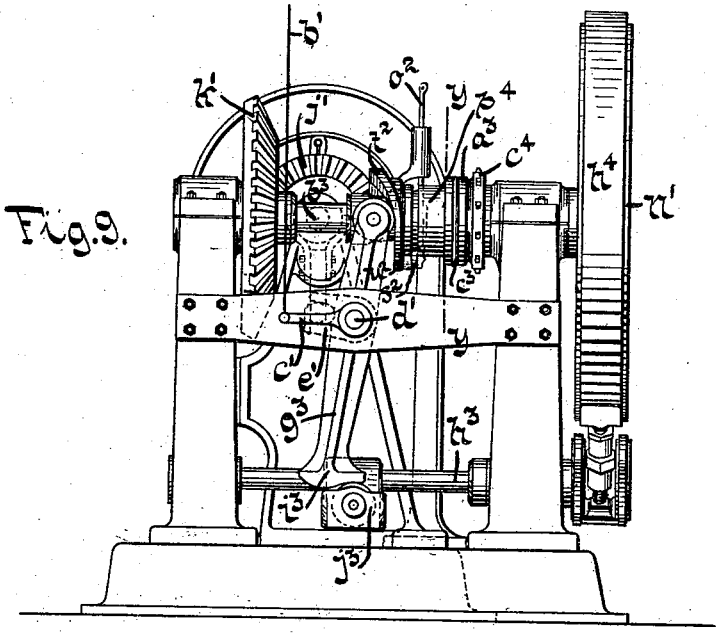
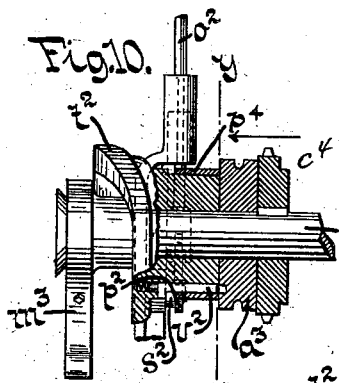
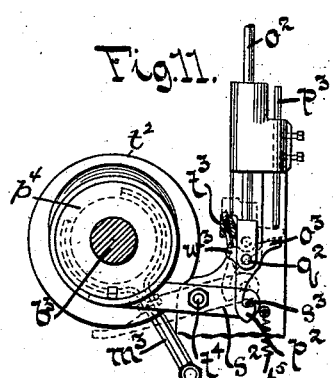
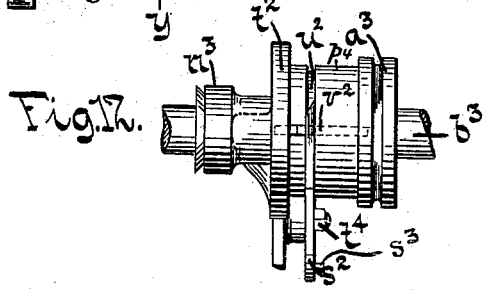
Witnesses:
Inventors:
Thos V Allis.
Jos H Templin
by AP Thayer.
Attorney.

UNITED STATES PATENT OFFICE.

THOMAS V. ALLIS, OF NEW YORK, AND JOSEPH H. TEMPLIN, OF BROOKLYN, NEW YORK; SAID TEMPLIN ASSIGNOR TO SAID ALLIS.

MACHINE FOR SPLICING AND REREELING FENCING-STRIPS.

SPECIFICATION forming part of Letters Patent No. 543,823, dated July 30, 1895.

Application filed May 23, 1894. Serial No. 512,242. (No model.)

*To all whom it may concern:*

Be it known that we, THOMAS V. ALLIS, residing at New York, in the county of New York, and JOSEPH H. TEMPLIN, residing at Brooklyn, in the county of Kings, State of New York, citizens of the United States, have invented certain new and useful Improvements in Machines for Splicing and Rereeling Fencing-Strips, of which the following is a specification.

Our invention consists of improved apparatus for producing strips for fencing of great length by means of rereeling, splicing, and spooling, preparatory to slitting, galvanizing, and other steps in the process of manufacture, as hereinafter fully described, reference being made to the accompanying drawings, in which—

Figure 5:
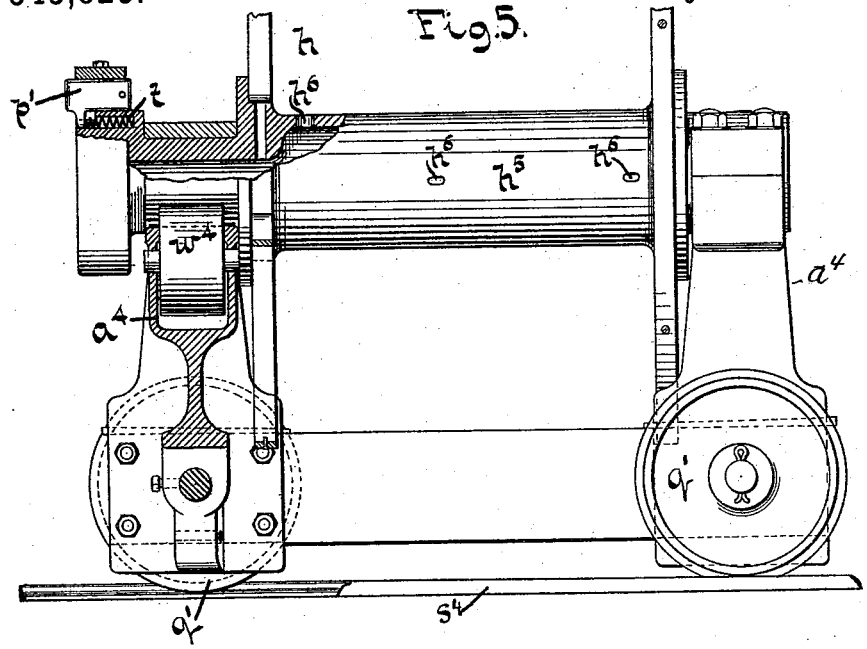
Figure 6:
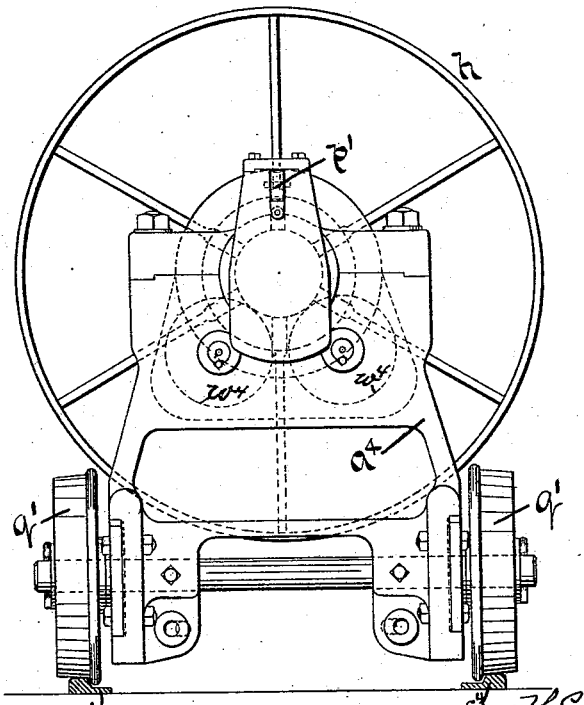
Figures 7, 8:
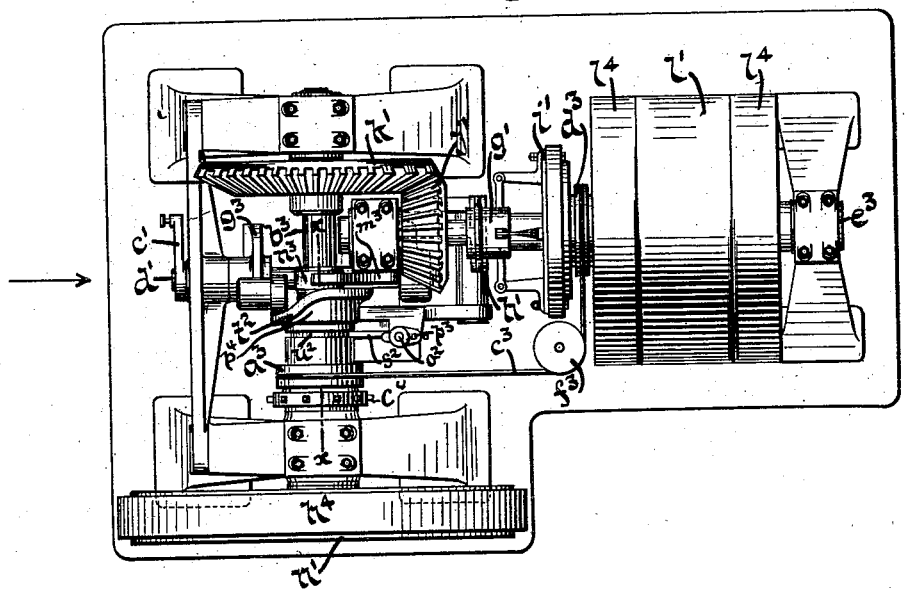

Figure 1 is a plan view of the apparatus comprising the plant. Fig. 1$^a$ is a side elevation of the said apparatus comprising the plant with the housings of the correcting and straightening rolls omitted. Fig. 2 is a side elevation of the tension apparatus on a larger scale. Fig. 3 is a front elevation of said tension apparatus. Fig. 4 is a plan view of the same. Fig. 5 is a side elevation of the receiving-reel with a part in section. Fig. 6 is an end elevation of said reel. Fig. 7 is a plan view of the reel-driving mechanism. Fig. 8 is a side elevation of said reel-driving mechanism. Fig. 9 is an elevation of said reel-driving mechanism as seen looking in the direction indicated by the arrow, Figs. 7 and 8. Fig. 10 is a detail in vertical section on line $x$ $x$, Fig. 7. Fig. 11 is a detail in transverse section of the reel-driving shaft on line $y$ $y$, Figs. 9 and 10. Fig. 12 is a detail in plan view of the clutch apparatus shown in detail in Figs. 10 and 11, as seen looking at the under side.

At $a$, Figs. 1 and 1$^a$, is shown in plan and side view a reel upon which coils of comparatively short lengths of strips, as coiled at the rolling-mill, are placed to begin with, the disk $b$ of said reel being removable, so that said coils can be slipped on the reel-core, consisting of a circle of stud-pins $c$, projecting from the opposite disk of the reel, the axle of which is mounted in the stand $d$. The disk $b$ is replaced after the coil is put on the core, its purpose being to keep the coils on the core-pins and prevent them from dislodging by escaping sidewise while unwinding, as they would if not protected by said disk.

The free end of the first strip is first threaded through correcting-rolls $a^5$, then through straightening-rolls $b^5$, and then through what I call an "inspector," which consists of a gaging-die $f$, fixedly placed in the line of travel of the strips and having a passage through which the strips of proper gage will pass freely, but if too large in any part the strips will bind and cause stoppage of the entire apparatus for correcting the defect.

The correcting-rolls are designed to flatten down the edges of the strips, which sometimes get turned up by the stresses caused when kinks and snarls occur in unwinding, and the straightening-rolls straighten out any abrupt bends that may occur. The rolls $a^5$ are geared together, but are otherwise ungeared, and a ratchet $a^6$ and lever $a^7$ are provided to turn them by hand in case the strip happens to be rolled or kinked up at the edge or edges to such extent that it will not pass in the ordinary operation of the apparatus and stops the same, said rolls running idly with the strip except when worked by the lever. From the inspector the strip is looped around the sheave-pulley $g$ of an automatic tension-relief device employed to prevent undue strain upon the paying-off reel when the strips on said reel become tangled, which quite frequently happens, and if not relieved by the yielding-tension device and instantly stopped by the automatic stop mechanism of the reeling-machine the paying-off reel would be torn from the floor by reason of the high speed and momentum of the heavy and heavily-loaded receiving-reel designed to carry about three tons.

From the tension-pulley the strips pass on to the large reel $h$, on which the spliced strips are to be wound in great length, so that the subsequent slitting, galvanizing, twisting, and other processes in the steps of manufacture may be much more continuous than with the shorter lengths turned out from the rolling-mill, whereby much time is saved and the great disadvantages of frequent interruptions in the processes are avoided.

Between the tension-pulley $g$ and the receiving-reel the strips may pass over one or more carrying-rolls $i$ to prevent sagging too much, and in advance of said receiving-reel is a traverse-guide $j$ for evenly distributing the coils. Any approved form of distributer may be used. It is not therefore necessary to describe or illustrate it here.

When a coil has been delivered from the reel $a$. The machine is stopped and another coil is put on said reel. Then the ends of the two have to be spliced, for which purpose a grinder is provided at $k$ for scarfing the ends. A brazing-forge $l$ is also provided; also a press $m$ for pressing the lapped and brazed ends together to make a firm adhesive joint; also a grinder $n$ for trimming the brazed joints.

The grinder may consist of any ordinary kind. In this case it is represented as driven by a belt $o$ from the shaft $p$, and the brazing-forge may consist of a gas-furnace or the ordinary simple kind having a small fan-blower $q$ beneath the pan to be worked by hand, as such blowers usually are.

The strips being thus spliced the machine is set in motion again for continuing the coiling process, this being done by the attendant pressing down the hand-lever $s$, which is pivoted at $t$, and is connected by the rod $u$ with the bell-crank $v$, which is connected by another rod $w$ with another bell-crank $a'$, which is connected by the rod $b'$ with the arm $c'$ of a rock-shaft $d'$ that carries the jaw-arm $e'$, (dotted lines, Figs. 8 and 9,) which engages one end of the bell-crank $f'$, (dotted lines, Fig. 8,) the other end of which, being suitably forked, engages the sliding clutch-hub $g'$ by the stud-pins $h'$ suitably to connect the friction-clutch $i'$ when said lever $s$ is so pressed down and starts the machine, which is driven by the bevel-pinion $j'$ and the bevel-wheel $k'$, when the clutch is thus connected with the driving-pulley $l'$, the shaft $b^3$ of the bevel-wheel $k'$ being coupled to the reel $h$ by the disk $n'$, having the bolt-sockets $o$ in its side in which the clutch-bolt $p'$ engages to connect the reel, said reel being mounted on truck-wheels $q'$, whereon it is moved after receiving the coils to the place where it is to deliver the same, as to the barbing and slitting machines.

A rail-track $s^4$ is provided for moving the reel on, which track, reel, and the driving-disk $n'$ are all in such relation that when the empty reel is moved into position for receiving the coils the reel will be automatically clutched with the disk $n'$, the bolt either entering one of the bolt-sockets $o'$ or being pressed back by contact with the side of the disk between two sockets, so that when the disk starts the spring $t'$ thrusts the bolt forward into the first socket brought into alignment with the bolt. The turntable $s^5$ connects track $s^4$ with the main track $s^6$.

The tension-pulley $g$, over which the strips pass from the inspector to the reel, is mounted on a carriage $u'$, the wheels of which rest on rails $v'$, ranging in the direction in which the strips run. To the end of the carriage opposed to the direction of the pull of the strip a wire $w'$ is attached, which passes over guide-pulleys $a^2$ $b^2$, and has a weight $c^2$ opposing the pull of the strips. The carriage $u'$ also has a catch $d^2$ by which it is held in the normal position by hooking on the short arm of a tripping-lever $e^2$ suspended on the pivot-shaft $f^2$ with its lower end fronting the end of a spring-buffer $g^2$ opposing the pull of the carriage $u'$ on the tripping-lever. The pivot-shaft $f^2$ of this lever has a crank $h^2$, which is connected by the rod $i^2$ with the bell-crank $j^2$, which is connected by the rod $l^2$ with the bell-crank $m^2$, which is connected by the rod $n^2$ with the vertically-sliding rod $o^2$, having a hook $p^2$ hanging from its lower end by a pivot $q^2$ and engaging the clutch-tripping wedge $s^2$, pivoted at $t^4$, said wedge being arranged with its free end in suitable relation to the hub $p^4$ of the cam $t^2$ to gravitate or be pulled by a spring $t^5$ into the groove $u^2$ and engage the head of the key $v^2$ and disconnect the loose pulley $a^3$, which, with the cam $t^2$, is fitted on the shaft $b^3$ which carries the disk $n'$, the cam being also fitted loosely on the shaft.

The pulley $a^3$ is connected by the belt $c^3$ with the pulley $d^3$ on the driving-shaft $e^3$ and connected with the driving-pulley $l'$, said belt passing around the guide-pulleys $f^3$, whereby pulley $a^3$ is always in motion when the driving-pulley $l'$ is running. The cam $t^2$ is employed to actuate the rock-lever $g^3$, attached to rock-shaft $d'$ to automatically disconnect clutch $i'$ and to apply the brake $h^4$ to the disk $n'$ for stopping the reel $h$ when the inspector or a tangle on the paying-off reel stops a strip, the operation being as follows: When the strip is so stopped, the increased tension of the strip, owing to the continued motion of the reel $h$, pulls the trip-lever $e^2$ over against the buffer $g^2$ till the catch $d^2$ escapes, at the same time turning the crank $h^2$ so that it pulls wedge $s^2$ and releases clutch-key $v^2$, which then clutches cam $t^2$, with the pulley $a^3$, so that the cam being set in motion throws rock-lever $g^3$ and rock-shaft $d'$ to disconnect clutch $i'$ at the same time the foot $i^3$ of the rock-lever depresses the arm $j^3$ of the rock-shaft $h^3$, which tightens the friction-brake $h^4$. Meanwhile the carriage $u'$ of the tension-pulley $g$ being released, but retarded by the weight $c^2$, moves along the rails $v'$ to give way to the reel until it stops, thus preventing breaking or pulling down the paying-off reel and doing other damage sure to occur before the receiving-reel could be stopped, which, owing to its high speed and great weight, cannot be stopped suddenly.

The catch $d^2$ is provided with a spring-actuated presser $l^3$ to cause it to engage the end of lever $e^2$ promptly when the carriage returns to its normal position, the return being effected by the weight $c^2$ when the strip is readjusted for further operation of the machine.

The catch has a bevel end adapted for automatically engaging the lever on the return of the carriage to its place.

For insuring the stopping of the cam $t^2$ after having thrown the rock-lever $g^3$, and being in position to allow the rock-lever freedom for being returned to its normal position when the machine is started again, a friction-brake $m^3$ is applied to the hub $n^3$ of the cam, and provision is made for releasing the wedge $s^2$ from the hook $p^2$, so that in case the hook may not drop quick enough the wedge can gravitate or be otherwise forced into the groove $u^2$, ready to disconnect the key $v^2$ on its return to the position for being disconnected, the said provision being in this case the arm $o^2$ projecting from the hub of the hook, and the adjustable-stop $p^3$, against which the arm strikes when the hook has raised and shifted the wedge, and which causes the hook to swing clear of the stud-pin $s^3$, by which it engages the wedge, and a spring-presser $t^3$ is arranged in relation to an opposite arm $w^3$ of the hook to cause it to engage the stud-pin when the arm $o^3$ drops away from stop $p^3$.

The reel $h$ is mounted on antifriction-rolls $w^4$ in the stands $a^4$ of the truck.

To reduce the motion of the reel $h$ as the size of the coil increases for uniform speed of the strips, or approximately so, I provide cone-pulley drivers $b^4$, on which two belts $x^4$ are used, so that they can be shifted from time to time to and from driving-pulley $l'$ and loose pulley $l^4$, or any other well-known form of varying the speed may be employed. The traverse-guide $j$ is to be driven by a chain-belt from the sprocket-wheel $c^4$ on the shaft $b^3$.

At $d^4$, I represent a crib, in which the detachable disk $b$ may be set temporarily in a convenient place when detached for applying the coils to be treated. The tension-pulley $g$ is provided with a guard $e^4$ at the side, around which the strips pass, to prevent the comparatively-stiff strips from springing away and escaping from the groove of the wheel, and there is also a guard $e^5$ to insure the entry of the strips into the groove of the pulley.

The core $h^5$ of the reel $h$ has holes $h^6$, in which the ends of the strips to be coiled on the reel are engaged to connect them with the core, the core of the reel being solid.

We claim—

1. The combination in strip splicing and re-reeling apparatus, of the paying off reel, the receiving reel, the truck carrying the receiving reel, driving apparatus for said receiving reel and means for automatically clutching said reel and the driving apparatus on return of the reel to its working position substantially as described.

2. The combination in strip splicing and re-reeling apparatus, of the paying off reel, having the removable disk, the receiving reel, the truck carrying the receiving reel, driving apparatus for said receiving reel, and means for automatically clutching said reel and driving apparatus on the return of the reel to its working position substantially as described.

3. The combination in strip splicing and re-reeling apparatus, of the paying off reel, the relief tension pulley, the counterweighted carriage for the pulley catch normally holding the carriage in position, mechanism for releasing the carriage, receiving reel and means for operating said receiving reel substantially as described.

4. The combination in strip splicing and re-reeling apparatus, of the paying off reel, the relief tension pulley, the counterweighted carriage for the pulley receiving reel, automatic stop mechanism for the receiving reel, and a trip for said stop mechanism controlled by said relief tension pulley substantially as described.

5. The combination in strip splicing and re-reeling apparatus, of the paying off reel, the inspector, the relief tension pulley, receiving reel, and means for operating said receiving reel substantially as described.

6. The combination in strip splicing and re-reeling apparatus, of the paying off reel, the correcting rolls, the relief tension pulley, trip and automatic stop mechanism, receiving reel, and means for operating said receiving reel substantially as described.

7. The combination in strip splicing and re-reeling apparatus of the paying off reel, the straightening rolls, the relief tension pulley, trip and automatic stop mechanism, receiving reel, and means for operating said receiving reel substantially as described.

8. The combination in strip splicing and re-reeling apparatus, of the paying off reel, the inspector, the relief tension pulley, receiving reel, means for operating said receiving reel, automatic stop mechanism for said driving apparatus, and a trip for said stop mechanism controlled by the tension relief pulley substantially as described.

9. The combination in strip splicing and re-reeling apparatus, of the paying off reel, the tension relief pulley, carrier for said pulley, automatic trip mechanism of the carrier, and the receiving reel, said trip mechanism for the carrier controlled by excessive tension of the strip substantially as described.

10. The combination in strip splicing and re-reeling apparatus, of the paying off reel, the tension relief pulley, carrier for said pulley, retarder for said carrier, automatic trip mechanism for the carrier, and the receiving reel, said trip mechanism for the carrier controlled by excessive tension of the strip substantially as described.

11. The combination in strip splicing and re-reeling apparatus, of the paying off reel, the inspector, the relief tension pulley, carrier for the tension pulley, receiving reel, automatic releasing device for the tension pulley carrier, and a trip for said releasing device controlled by excessive tension of the strip substantially as described.

12. The combination in strip splicing and re-reeling apparatus, of the paying off reel, the inspector, the relief tension pulley, carrier for the tension pulley, the retarder for said carrier, and the receiving reel substantially as described.

13. The combination in a strip splicing and re-reeling apparatus, of the paying off reel, the inspector, the relief tension pulley, carrier for said tension pulley, automatic releasing device for the tension pulley carrier, a trip for said releasing device controlled by excessive tension of the strip, and the retarder for the tension pulley carrier substantially as described.

14. The combination in a strip splicing and re-reeling apparatus, of the paying off reel, the tension relief pulley, one or more guards for directing and confining the strips on said pulley, and the receiving reel substantially as described.

15. The combination with the relief tension pulley and the carrier therefor, of the spring catch on the carrier, the holding and the releasing lever, and the spring buffer opposing the pull of the strips on the releasing lever substantially as described.

16. The combination with the clutch on the driving shaft, of the elbow lever for shifting said clutch, the rock-shaft, the jaw arm of said shaft connecting with said elbow lever, the rod, and arm connected with said rock-shaft for connecting the clutch, and the cam and rock-lever for disengaging said clutch substantially as described.

17. The combination with the clutch on the driving shaft, of the rock shaft connected with said clutch, the rock-lever on said rock shaft, rod, and arm connected with said shaft for operating it, the disk on the reel driving shaft, friction brake, the foot piece of the rock-lever, and the arm of the brake shaft all arranged to disconnect the driving shaft and apply the brake simultaneously substantially as described.

18. The combination with the rock-lever on the clutch operating shaft, and the brake shaft controlled by said rock-lever, of the cam and pulley geared with the driving pulley independently of the reel shaft, clutch and wedge controlling the cam, and the wedge shifting hook controlled by the hand lever for stopping the reel and applying the brake substantially as described.

19. The combination with the cam and pulley clutch controlling wedge, of the wedge controlling hook, the hook controlling rod, the pivoted connection of the hook and rod, and the arm and stop for disconnecting the hook from the wedge substantially as described.

20. The combination with the cam and pulley clutch controlling wedge, of the wedge controlling hook, the hook controlling rod, the pivoted connection of the hook with the rod, the arm and stop for disconnecting the hook from the wedge, and the arm and spring presser for engaging said hook with the wedge substantially as described.

21. The combination with the reel driving disk having the bolt sockets in the side, of the traveling reel having the automatically engaging clutch bolt in the end of the reel shaft substantially as described.

22. In re-reeling apparatus for metallic strips, the combination of a paying off reel located in a fixed position, a receiving reel located on a support adapted to transfer said reel from the place of receiving the strips to a different place of delivering them and back, driving mechanism for said receiving reel located in the relation to the paying off reel to connect with the receiving reel for operating it to receive the strips, and means to connect said receiving reel and driving mechanism when said reel is in the position for receiving the strips substantially as described.

23. In re-reeling apparatus for metallic strips, the combination of a paying off reel located in a fixed position, a receiving reel located on a support adapted to transfer said reel from the place of receiving the strips to a different place for delivering them and back, driving mechanism for said receiving reel located in the relation to the paying off reel to connect with the receiving reel for operating it to receive the strips, and an automatic clutch to connect said receiving reel and driving mechanism when the reel comes to the receiving position, and to disconnect them when said reel leaves said position substantially as described.

24. In re-reeling apparatus for metallic strips, the combination of a paying off reel located in a fixed position a receiving reel located on a support adapted to transfer said reel from the place of receiving the strips to a different place of delivering them, a traverse guide for the strips located relatively to the position of said receiving reel when receiving the strips for laying the coils thereon, driving mechanism for said receiving reel located in a fixed position relatively to said paying off reel and traverse guide for connecting with said re-reeling reel when in the position for receiving the strips, and means to connect said receiving reel and driving mechanism when in said position for receiving substantially as described.

Signed at New York city, in the county and State of New York, this 15th day of May, A. D. 1894.

THOMAS V. ALLIS.
JOSEPH H. TEMPLIN.

Witnesses:
W. J. MORGAN,
S. H. MORGAN.